Jan. 23, 1968    R. A. CORREA    3,364,596
BOWLING SCORE KEEPING TEACHING DEVICE
Filed July 19, 1965
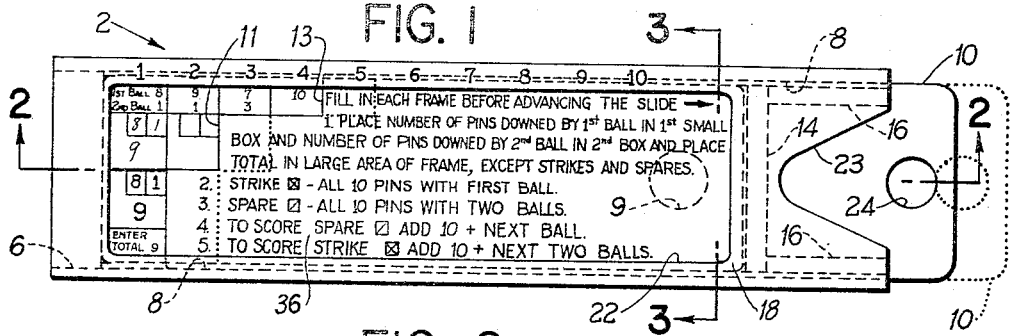
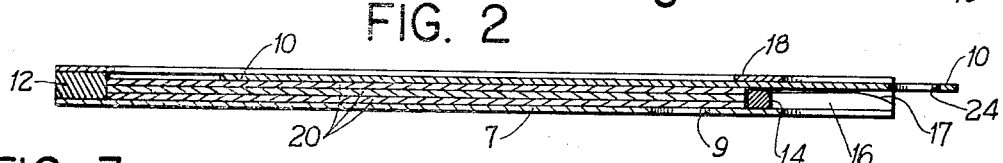
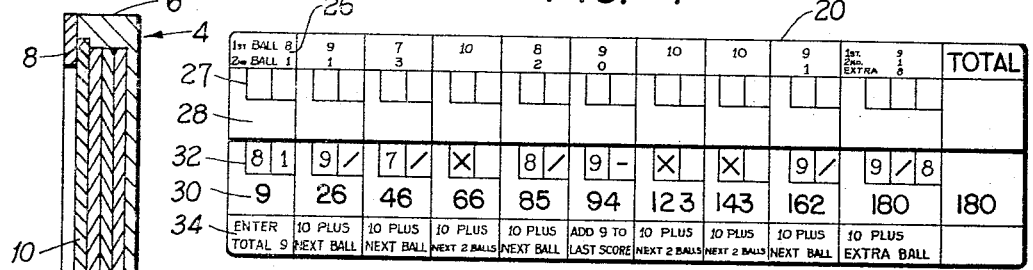
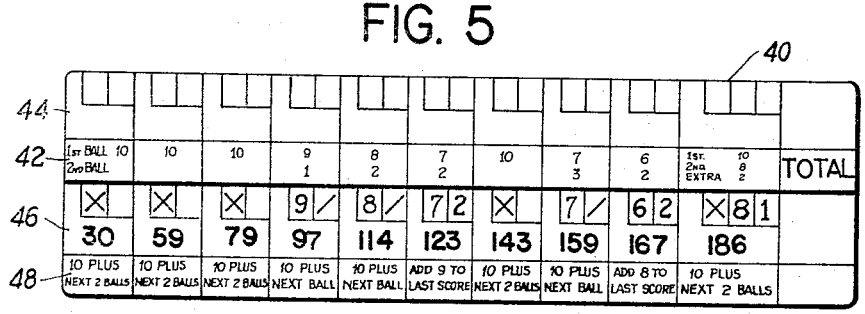
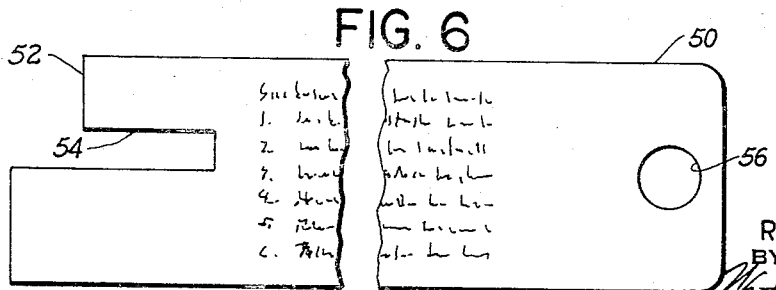
INVENTOR
RODOLFO A. CORREA
BY
ATTORNEY

United States Patent Office 3,364,596
Patented Jan. 23, 1968

3,364,596
BOWLING SCORE KEEPING TEACHING DEVICE
Rodolfo A. Correa, Little Silver, N.J., assignor to American Machine & Foundry Company, a corporation of New Jersey
Filed July 19, 1965, Ser. No. 473,075
10 Claims. (Cl. 35—9)

This invention relates to the game of bowling, and more particularly to a device for facilitating the teaching of score keeping.

As in most sports, bowling is subject to prescribed scoring rules which must be followed in order to obtain the proper score for each game bowled by a bowler. In order for the bowler to enjoy the game to its fullest extent, it is important that he understand the rules for scoring.

Beginning and novice bowlers usually learn scoring from other bowlers, which is embarrassing to many individuals, and/or by studying written instructions, such as those published by the American Bowling Congress. Even when properly applied, these procedures often lead to a faulty understanding of the bowling scoring rules, thus interfering with the enjoyment of the game. Even if scoring rules are fully understood, scoring practice is desirable in order to insure the proper application of rules of scoring at all times. The present invention provides a novel method for teaching the proper scoring of a game and apparatus for making this possible. The result is that the bowler acquires a full understanding of bowling scoring techniques and, therefore, becomes adapt in keeping score. The individual who, because of lack of understanding in scoring, may have hesitated to participate in and enjoy this great game and who now, in using the apparatus involving the invention will find it possible to readily learn and understand scoring techniques, will acquire an interest in the game. In addition, the ability to score properly obviously increases both interest in, and enjoyment of bowling even for those who do bowl.

The present invention constitutes a solution of the problem of bowling score keeping by providing a device which contains information and means which instruct its user so that he can enter and compute the correct score of at least one simulated game. This device, therefore, allows its user to acquire the ability to score properly, and thereby increases his interest in and enjoyment of the game.

It is an object of the invention to provide a novel device for teaching the scoring of the game of bowling.

It is a further object of the invention to provide a bowling score teaching slide rule which will enable those using it to acquire proficiency in the technique of scoring the game of bowling.

It is a further object of the invention to provide a device for teaching the scoring of the game of bowling having means which displays information complying with the approved scoring rules for the game of bowling and means which enables its user by reference to such information to acquire the ability to keep score.

The invention includes a manually operated device having means which can be moved a predetermined amount after each frame of a simulated game has been scored in order to allow its user to compute, enter and score the frame to frame score of a game on a score sheet carried by the device.

It is a further object of the invention to provide a novel device for teaching a trainee or bowler practicing the art of keeping score in the game of bowling by providing a simple slide rule type of device which contains information indicating pinfall for each ball of each frame of a game, the correct score for each frame, means for scoring each frame in accordance with the indicated frame by frame pinfall and scoring rules, and means forming a part of the device designed to limit access to the correct score of each frame until after the user has computed and entered its score.

With these and other objects not specifically mentioned in view, the invention consists in certain combinations and constructions which will be described fully hereinafter, and then set forth in the claims hereunto appended.

In the accompanying drawings which form a part of this specification, and in which like characters of reference indicate the same or like parts:

FIGURE 1 is a plan view of a preferred embodiment of the invention;

FIGURE 2 is a sectional view taken on line 2—2 in FIGURE 1;

FIGURE 3 is a sectional view taken on line 3—3 in FIGURE 1;

FIGURE 4 is a plan view of a preferred form of score sheet embodying the invention;

FIGURE 5 is a plan view of a modified form of score sheet embodying the invention; and FIGURE 6 is a plan view of a modified form of slide constructed in accordance with the invention.

Referring to the drawings, the device or apparatus selected for purposes of illustration is designated generally 2. It can be made in several different forms and shapes. As shown herein it comprises what can be termed a teaching slide rule and includes an elongated body or housing 4 made from any suitable material, such as wood, paperboard, plastic, metal or combinations thereof. Housing 4 is provided with two laterally spaced side walls 6 and a bottom 7. Each wall 6 includes an elongated slot or groove 8 which support the sides of a slide 10 for longitudinal sliding movement relative to housing 4. An end cross piece 12 is suitably attached to the device, as by adhesive between the rear ends of walls 6. A front cross piece 14 extends between side walls 6. The front ends of two opposed members 16, as viewed in FIGURE 2, are tapered or beveled as at 17 in order to provide ready entry of slide 10 in operative relation to side walls 6 and a score sheet or sheets 20 provided in housing 4.

A cover sheet or plate 18 is suitably secured to the tops of side walls 6, end cross piece 12. and front cross piece 14. Cover sheet 18 can be formed from a suitable material such as paperboard, plastic, metal or combination thereof. It is provided also with a cut-out front section 23. This exposes the outer end of slide 10 and enables the scorer to grasp it, as by hole 24, and move slide 10 to the right, as viewed in FIGURE 1, as he proceeds in scoring a game, or to the left, to where it abuts cross piece 12, in readying the device for scoring a selected simulated game. Slide 10 is formed with two stepped cut-out portions 11 and 13 for purposes described more in detail hereinafter.

Body 4 can be formed in other ways from that illustrated. For example it could be made of plastic and produced as a single unit by suitable known plastic molding techniques. In the embodiment illustrated, housing 4 is made from paperboard and wood and cover sheet 18 is formed of paperboard. This combination of materials results in a strong, light construction which can be made simply and at relatively low cost.

Referring to FIGURE 1, it will be seen that cover sheet 18 is formed with an opening 22 through which the printed instruction information indicia on slide 10 can be viewed. Opening 22 also provides access to a score sheet 20 in housing 4 of a simulated game to be scored for entries of frame to frame pinfall results and scores and to the instructions printed thereon. While the instructive data on slide 10 and a score sheet 20 as shown herein are quite detailed, it will be appreciated that they can be printed in such manner that, as one learning to score becomes more proficient, a minimum of information can be given. The instructive information shown herein is directed primarily to aid a beginner.

One or more score sheets 20 can be held in housing 4. As shown there are three. As best shown in FIGURES 2 and 3, they rest on bottom 7 of housing 4 between side walls 6. Endwise movement is prevented by cross pieces or walls 12, 14. An opening 9 in bottom 7 provides means for pushing a completed score sheet 20 upwardly in housing 4 so that it can be removed. Each score sheet 20 can, if desired, be printed on both sides with such data, as shown, or as desired, so that in the illustrated embodiment six simulated games can be scored. Since each game can be varied in complexity, a trainee or one practicing scoring can be subjected to a wide range of scoring problems and improve his scoring skill thereby.

The top elongated part of cover portion or sheet 18 contains longitudinally spaced indicia 1, 2 . . . 10 corresponding to the ten (10) frames of a game of bowling. Referring to FIGURE 1, it will be seen that this indicia is so printed or otherwise applied to cover portion 18 that each member 1–10 is located above the corresponding frame pinfall results printed on the visible score sheet 20 in housing 4. Score sheet 20, FIGURES 1 and 4, carries a top row of indicia 26 indicating the first ball and second ball pinfall results for each frame of a game, including a third ball in the tenth frame where required. Beneath row 26 is a row of blank spaces 28 corresponding to a conventional score sheet in which the trainee or other bowler enters the pinfall result indicated in row 26 for each ball of a frame, and computes and enters the score for each frame. Row 30 contains the correct pinfall entries for each ball in its proper small box 32 and also the proper score for each frame. Row 34 on score sheet 20 provides instruction indicia which when considered with indicia on slide 10 enables the trainee or bowler testing his scoring ability to make the proper ball by ball entries in the small boxes of each frame and compute the proper frame by frame score.

It will be noted upon reference to FIGURE 1, that at the beginning of a game to be scored the free end of slide 10 abuts end cross piece 12. Cut out portions 11 and 13 of slide 10 are so designed that at that time, the only part of the score sheet 20 visible is that which shows the pinfall for the two balls of frames 1, 2 and 3 plus the empty frame box in row 28 for frame 1. Cut out 11 is of such length that as slide 10 is moved from left to right in accordance with the invention, as viewed in FIGURE 1, only one additional frame box is exposed on score sheet 20. Cut out 13 is of such length that three pinfall results in row 26 are disclosed. This enables the scorer to consider and acquire information sufficient to enable him to compute the score properly under all conditions, including that when three strikes in succession are made.

In use, referring again to FIGURE 1, when slide 10 is at its innermost position; i.e., when the scorer is about to begin scoring the game, he sees the empty frame boxes frame 1 of the game in row 28 and also the pinfall results in row 26 for frame 1. From information indicia 36 on slide 10, he knows that he is to enter the pinfall results 8 and 1 in the corresponding small boxes 27 for frame 1 of row 28 and the total 9 for frame 1. He then moves slide 10 to the right (as viewed in FIGURE 1) one frame step. This exposes the first frame correct pinfall entries in their proper small boxes 32 and the total 9 for frame 1. The scorer thereby knows that he has scored frame 1 pinfall results properly.

Slide 10 now is in the full line position shown in FIGURE 1. The scorer now enters 9 and 1 or upon reference to indicia printed on slide 10 he sees that he has made a spare. Therefore, in order to conform to customary scoring practice he will enter "/" instead of the numeral 1 in the second small box 27 of the second frame score box in row 28. Indicia 36 instructs the bowler that when a spare is made he is entitled to add 10 to the last score plus the pinfall on the first ball of the next frame. However, upon reference to pinfall row 26 he can see that the first ball pinfall for the next frame; i.e., frame 3, is 7. Therefore, he knows that he is to add 17 to the first frame score to obtain the second frame score of 26 which he enters. When he advances slide 10 one frame step he finds in proper score row 30 for frame 2 the proper comparative score is 26 and he knows that he has scored correctly.

The scoring of the simulated game selected proceeds from frame to frame as described above until the game is scored at 180 and concluded. In the case of strikes the information of indicia of pinfall row 26 and that on slide 10 and in row 36 of a selected score sheet 20 enable the scorer to proceed simply and clearly to enter and compute the proper score for each frame of the game.

Score sheet 40 shown in FIGURE 5 is used in housing 4 in the same manner as score sheet 20. It differs therefrom only in the location of the several rows of indicia and boxes thereon. In comparing them, row 42 corresponds to row 26, row 44 corresponds to row 28, row 46 corresponds to row 30, and row 48 corresponds to row 34. The arrangement of indicia on sheet 40 is such that entries can be made by the scorer at the top rather than at an intermediate location on the score sheet as in score sheet 20. It will be noted that although pinfall of 10 is indicated in each of the first ball small boxes for the first three frames of the selected game to be scored; i.e., on the selected sheet 40, shown in FIGURE 5, the scorer on reference to indicia on slide 50 which contains the same indicia as slide 10 actually enters or is instructed to enter an X to show a strike. Slide 50 functions in the same manner as slide 10. Cut-out portions 52 and 54 correspond to similar portions 11 and 13 of slide 10. Opening 56 provides means for moving slide in or out of housing 4.

As described hereinabove, the trainee or bowler practicing scoring enters each game scored with some type of writing medium such as pencil or pen. The invention also includes the use of a narrow strip of flexible plastic or material which can be used with a stylus to delineate numbers, etc., in scoring. In this case the material would be placed adjacent either row 28 or 44, and slides 10 and 40 would be modified accordingly to effect this purpose.

It will be evident that the invention provides a simple device which will enable those who know little or nothing about scoring the game of bowling to learn the intricacies thereof, or one which will assist those who are learning to gain with a minimum of effort a complete knowledge for scoring the game.

What is claimed is:

1. A bowling score teaching slide rule comprising a housing, a score sheet carried by said housing, said score sheet being provided with the pinfall results for each ball of each frame, frame score boxes for entries of scores therein, frame score boxes containing the corresponding correct score for each frame, and instruction indicia for computing the score for each frame, a member movably mounted in said housing and superimposed over portions of said score sheet, and means on said member such that when it is moved relative to said score sheet, the pinfall results and frame score boxes for each frame are sequentially exposed so the scorer can enter the pinfall result of each ball of each frame in each respective frame box and compute the cumulative score, at each frame by adding at least the pinfall results for that frame to the score at an exposed previous frame and other means on said member for exposing for comparison the correct score of each previous frame.

2. The invention defined in claim 1 wherein said member is provided with complementary instruction indicia for effecting the proper entry of symbols of pinfall results in the frame boxes of said score sheet.

3. The device defined in claim 1 including indicia on said score sheet giving the correct score for each frame of said game, and wherein said last-named means comprises a slide having cut out portions, which slide can be moved to make visible in succession the frame boxes in which scores are to be placed and in response to each movement of said slide effect the display of the correct score of the last frame for comparison with the computed score.

4. A bowling score teaching slide rule comprising a housing having means for holding a score sheet containing frame score boxes and information including pinfall results for each ball of a simulated game to be scored, an open section in said housing through which access to said score sheet is obtained to make entries in said frame score boxes and a member including instruction indicia for making proper entries in said frame score boxes mounted in said housing over said score sheet and movable by the scorer relative thereto to effect the sequential display of said pinfall results and said frame score boxes to enable the scorer to compute the cumulative score for each frame according to the instruction indicia and enter the same in said frame score boxes.

5. The invention defined in claim 4 wherein said score sheet also contains the proper score for each frame of said game, and said member includes means for effecting the display of said proper score in response to the movement of said member predetermined distances by said scorer after he has computed and entered the score in each successive frame box on said score sheet.

6. The invention defined in claim 5 wherein said housing contains a plurality of score sheets representing simulated games of varying complexity to be scored, and means for effecting the removal of a completed scored score sheet from said housing, whereby another score sheet can be substituted therefor.

7. A bowling score instructing slide rule comprising an elongated housing, at least one source of information indicating the frame by frame pinfall and score contained in said housing, and including a longitudinal row of empty frame boxes for entry by the scorer of the ball by ball and frame score for each frame based on information obtained from said source of information, said housing having an elongated open section providing access for the scorer to said empty frame boxes, a slide carried by said housing, and terminal portions on said slide for providing the scorer with the necessary information from said source of information in response to the stepwise movement of said slide by said scorer relative to said housing a longitudinal distance equal to the width of a frame box after he has computed and entered the score for this and in the preceding frame.

8. Bowling score teaching apparatus, which comprises:
a housing,
means mounted in the housing including frame by frame pinfall results of a sample bowling game and frame score boxes for entry of scores therein,
a member having instruction indicia thereon for computing the score of a bowling game, said member being superimposed over such portions of said last named means that more frames of the sample pinfall results are exposed than frames of the frame score boxes,
means movably mounting said member relative to said housing for sequentially exposing the frames of the frame by frame pinfall results and the frame score boxes so that a scorer may compute the cumulative score of each successive frame by adding the pinfall results exposed for that frame, and if necessary according to the indicated pinfall results and the instruction indicia, the pinfall results of subsequent frames, which subsequent pinfall results are exposed by said member, to the score of an exposed previous frame and enter said computed score in the space for said frame in the appropriate frame score box.

9. Apparatus according to claim 8, wherein:
said means mounted in the housing further includes frame by frame correct scoring for the sample game, and
said member having instruction indicia thereon is superimposed over such portions of said last named means that one less frame of the correct scoring is exposed than the frame score boxes, so that as said member is moved relative to said housing, enabling a scorer to compute the cumulative score for each frame according to the frame by frame pinfall results, the correct score for the previous frame is exposed for comparison.

10. A bowling score teaching slide rule, comprising:
a housing,
a score sheet in said housing and containing the pinfall results for each ball of a simulated game to be scored, said pinfall results being arranged according to frames,
a longitudinal row of empty frame boxes,
a longitudinal row of frame boxes containing the proper score for each frame of said simulated game,
a member having instruction indicia thereon for computing the score for a bowling game, said member being superimposed over such portions of the scoring sheet that one more frame of the empty frame boxes is exposed than the frames of the proper score, and two more frames of the pinfall results are exposed than the frames of the empty frame boxes, and
means mounting said member for relative movement with respect to the housing for sequentially exposing each frame of the empty score boxes so that a scorer may compute the cumulative score for each successive frame by adding the exposed pinfall results indicated for that frame, and if necessary according to the pinfall results and the instruction indicia, the pinfall results of subsequent frames, which subsequent pinfall results are exposed, to the score of an exposed previous frame and enter said computed score in the appropriate empty frame box, movement of said member to expose the next empty frame box for computation and entry being operable to expose the proper score for the frame just computed for comparison purposes.

References Cited

UNITED STATES PATENTS

| 1,641,982 | 9/1927 | McDade | 35—9 |
| 1,666,337 | 4/1928 | McDade | 35—75 |
| 3,152,403 | 10/1964 | Betz | 35—9 |
| 3,230,641 | 1/1966 | Sloves | 35—9 |

FOREIGN PATENTS

| 249,888 | 8/1942 | Switzerland. |

EUGENE R. CAPOZIO, *Primary Examiner.*

R. W. WEIG, *Assistant Examiner.*